(12) United States Patent
Leung (10) Patent No.: US 8,873,956 B2
(45) Date of Patent: Oct. 28, 2014

(54) METHOD AND APPARATUS FOR PLANNING NETWORK CONFIGURATION IN AN OPTICAL NETWORK

(75) Inventor: Dion Kwun Kit Leung, Naperville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 946 days.

(21) Appl. No.: 12/387,023

(22) Filed: Apr. 27, 2009

(65) Prior Publication Data

US 2010/0040365 A1 Feb. 18, 2010

Related U.S. Application Data

(63) Continuation-in-part of application No. 12/228,763, filed on Aug. 15, 2008, now Pat. No. 8,712,237, and a continuation-in-part of application No. 12/228,762, filed on Aug. 15, 2008, now Pat. No. 8,078,435.

(51) Int. Cl.
*H04J 14/00* (2006.01)
*H04J 14/02* (2006.01)
*H04L 12/24* (2006.01)
*H04B 10/00* (2013.01)
*H04Q 11/00* (2006.01)

(52) U.S. Cl.
CPC .... *H04J 14/0227* (2013.01); *H04Q 2011/0086* (2013.01); *H04J 14/0283* (2013.01); *H04J 14/0284* (2013.01); *H04Q 2011/009* (2013.01); *H04L 41/145* (2013.01); *H04Q 11/0062* (2013.01); *H04L 41/08* (2013.01)
USPC .............. 398/57; 398/97; 398/173; 398/175

(58) Field of Classification Search
USPC .............................. 398/97, 57, 160, 173, 175
See application file for complete search history.

(56) References Cited

U.S. PATENT DOCUMENTS 5,027,079 A 6/1991 Desurvire et al.
5,720,607 A 2/1998 Morio et al.
(Continued)

FOREIGN PATENT DOCUMENTS

WO WO 01/47170 A2 6/2001

OTHER PUBLICATIONS

Momtahan, P., "The Case for Integrating Next-Generation Transport," (White Paper 74.1707E) Tellabs, (Rev. B: Feb. 2007).
(Continued)

*Primary Examiner* — Daniel Dobson
(74) *Attorney, Agent, or Firm* — Hamilton, Brook, Smith & Reynolds, P.C.

(57) ABSTRACT

Optical regenerators and amplifiers are expensive to implement and maintain. A method or corresponding apparatus in an example embodiment of the present invention relates to an optical planning tool that plans an optical network configuration by determining a plurality of costs for maintaining signal strength in corresponding network configurations including (i) a configuration of regenerators, (ii) a configuration of pre-or post-amplifiers, and (iii) a configuration of pre- and post-amplifiers in candidate locations and regenerator modules. The candidate locations for placing pre-or post-amplifiers are determined based on loss in each span, expected traffic patterns, and proposed regeneration locations along paths of expected traffic. The regeneration modules are located in locations determined based on the candidate locations. The example embodiment selects a configuration from among the network configurations as a function of the plurality of costs, helping reduce the cost of network deployment.

30 Claims, 8 Drawing Sheets

(56) References Cited

U.S. PATENT DOCUMENTS

| | | |
|---|---|---|
| 6,323,994 B1 | 11/2001 | Li et al. |
| 6,459,594 B1 | 10/2002 | Tsuji et al. |
| 6,466,972 B1 | 10/2002 | Paul et al. |
| 6,834,109 B1 | 12/2004 | Lin et al. |
| 6,952,529 B1 | 10/2005 | Mittal |
| 7,038,837 B2 | 5/2006 | Ng et al. |
| 7,046,426 B2 | 5/2006 | Ng et al. |
| 7,047,496 B2 | 5/2006 | Nelles et al. |
| 7,096,176 B1 | 8/2006 | Hess |
| 7,096,502 B1 | 8/2006 | Fox et al. |
| 7,623,785 B2 | 11/2009 | Krishnaswamy et al. |
| 7,684,696 B1 | 3/2010 | Hadden et al. |
| 7,697,455 B2 | 4/2010 | Sadanada |
| 7,703,091 B1 | 4/2010 | Martin et al. |
| 8,078,435 B2 | 12/2011 | Jenkins et al. |
| 8,447,181 B2 | 5/2013 | Jenkins et al. |
| 8,467,678 B2 | 6/2013 | Jenkins et al. |
| 8,712,237 B2 | 4/2014 | Jenkins et al. |
| 2002/0089863 A1 | 7/2002 | Yasumura |
| 2002/0176386 A1 | 11/2002 | Singh, et al. |
| 2003/0011846 A1* | 1/2003 | Gholamhosseini et al. .. 359/135 |
| 2003/0020977 A1* | 1/2003 | Smith et al. .................... 359/110 |
| 2003/0071985 A1 | 4/2003 | Mori et al. |
| 2003/0099014 A1* | 5/2003 | Egner et al. .................... 359/124 |
| 2003/0099018 A1* | 5/2003 | Singh et al. .................... 359/152 |
| 2004/0016002 A1 | 1/2004 | Handelman et al. |
| 2004/0047026 A1* | 3/2004 | Ng et al. ........................ 359/333 |
| 2004/0047028 A1* | 3/2004 | Ng et al. .................... 359/341.41 |
| 2004/0123284 A1 | 6/2004 | Bryant et al. |
| 2004/0143428 A1* | 7/2004 | Rappaport et al. .............. 703/22 |
| 2004/0186701 A1 | 9/2004 | Aubin et al. |
| 2004/0208535 A1 | 10/2004 | Bragg et al. |
| 2004/0208576 A1 | 10/2004 | Kinoshita et al. |
| 2004/0214577 A1 | 10/2004 | Borst et al. |
| 2004/0251962 A1 | 12/2004 | Rosnell et al. |
| 2005/0036788 A1 | 2/2005 | Matsuoka et al. |
| 2005/0041600 A1* | 2/2005 | Moffatt et al. ................ 370/254 |
| 2005/0066016 A1 | 3/2005 | Bailey et al. |
| 2005/0123027 A1 | 6/2005 | Cioffi et al. |
| 2005/0175279 A1 | 8/2005 | Nakajima et al. |
| 2005/0220136 A1 | 10/2005 | Shinomiya et al. |
| 2006/0019679 A1 | 1/2006 | Rappaport et al. |
| 2006/0067694 A1 | 3/2006 | Nozu |
| 2006/0287740 A1 | 12/2006 | Ertel |
| 2007/0172040 A1 | 7/2007 | Cesarini et al. |
| 2007/0183022 A1* | 8/2007 | Abbott ........................ 359/337.4 |
| 2007/0253712 A1* | 11/2007 | Katagiri et al. ................. 398/59 |
| 2007/0294342 A1 | 12/2007 | Shah et al. |
| 2008/0123586 A1 | 5/2008 | Manser |
| 2008/0181609 A1* | 7/2008 | Yi et al. .......................... 398/58 |
| 2008/0279552 A1* | 11/2008 | Ou et al. ......................... 398/45 |
| 2009/0103453 A1* | 4/2009 | Hand et al. .................... 370/254 |
| 2009/0144700 A1 | 6/2009 | Huff et al. |
| 2010/0040364 A1 | 2/2010 | Jenkins et al. |
| 2010/0040366 A1 | 2/2010 | Jenkins et al. |
| 2010/0042390 A1 | 2/2010 | Jenkins et al. |
| 2010/0042989 A1 | 2/2010 | Anand et al. |
| 2010/0142943 A1 | 6/2010 | Frankel et al. |
| 2010/0303473 A1 | 12/2010 | Alfiad et al. |
| 2013/0251360 A1 | 9/2013 | Jenkins et al. |
| 2013/0272697 A1 | 10/2013 | Jenkins et al. |

OTHER PUBLICATIONS

Jenkins, D. W. and Scholtens, D. A., "Metro WDM Network Design & Evolution: Positioning for the Transition to Optical Meshes," (White Paper 74.1717E), Tellabs, (Rev. A: Oct. 2006).

Papakos, K., et al., "Optical Dynamic Core Networks: Design, Implementation and Engineering Considerations," (White Paper 74.1825E) Tellabs, (Rev. A: Apr. 2007).

"BER vs. OSNR," Circadiant Tech Brief, (Tech Brief No. TB007), (Feb. 2003).

Gariépy, D. and Gang, H., "Measuring OSNR in WDM Systems—Effects of Resolution Bandwidth and Optical Rejection Ratio," EXFO Electro-Optical Engineering Inc., Application Note 098, (May 2005).

Cokrak, A.Cem and Altuncu, A., "Gain and Noise Figure Performance of Erbium Doped Fiber Amplifiers (EDFA)," *J. of Electrical & Electronics Engineering* (Istanbul University), 4(2):1111-1122 (Jun. 15, 2004).

U.S. Appl. No. 11/354,705, filed Feb. 14, 2006.
Non-published U.S. Appl. No. 11/354,705, filed Feb. 14, 2006.
Non-published U.S. Appl. No. 12/228,762, filed Aug. 15, 2008.
Non-published U.S. Appl. No. 12/228,776, filed Aug. 15, 2008.
Non-published U.S. Appl. No. 12/228,826, filed Aug. 15, 2008.
Non-published U.S. Appl. No. 12/228,763, filed Aug. 15, 2008.

* cited by examiner

METHOD AND APPARATUS FOR PLANNING NETWORK CONFIGURATION IN AN OPTICAL NETWORK

RELATED APPLICATIONS

This application is a continuation-in-part of U.S. application Ser. No. 12/228,762, filed Aug. 15, 2008, now U.S. Pat. No. 8,078,435 and U.S. application Ser. No. 12/228,763, filed Aug. 15, 2008 now U.S. Pat. No. 8,712,237. This application is also related to U.S. application Ser. No. 11/354,705, filed on Feb. 14, 2006, U.S. application Ser. No. 12/228,776, filed Aug. 15, 2008, and U.S. application Ser. No. 12/228,826, filed Aug. 15, 2008. The entire teachings of the above applications are incorporated herein by reference.

BACKGROUND OF THE INVENTION

Optical networks are capable of carrying the highest bandwidth amongst various forms of currently available network communications technologies and, as such, are well suited for high-speed, high-bandwidth network communications.

Optical regenerators and amplifiers are important building elements of a modern optical network. Regeneration is done because the links or spans between communicating elements (or nodes) in an optical network may be too long for optical signals to travel from one element to another. In this case, the signal can become so degraded that it may not be reliably decoded. Optical regenerators help prevent information loss by boosting the degraded signal. Similarly, optical amplification is done to raise optical power levels in long sections of optical fibers in an optical network in order to prevent information loss. Optical amplifiers boost the power of optical signals to higher levels and thereby reduce the noise level.

Optical Signal-to-Noise Ratio (OSNR) is a common metric used to determine whether a signal can be decoded reliably. The lower the level of OSNR, the less likely it is that a signal can be decoded correctly. Regenerators and amplifiers help improve (increase) OSNR, thereby improving the reliability of communications.

Raman amplifiers are a type of optical amplifiers that operate based on the Stimulated Raman Scattering (SRS) phenomenon. Raman amplification is stimulated when a lower frequency signal photon induces inelastic scattering of a higher frequency photon in an optical medium. As a result of this stimulation another photon is produced and the added energy of this additional photon is passed into the optical medium, thereby resulting in optical amplification.

Regenerators and amplifiers, including Raman amplifiers, are expensive devices. They require equipment to be installed, serviced, and maintained at each physical regeneration and amplification location. Such locations can be geographically distant from one another, difficult to access, and often necessitate paying for a lease to use the site. Therefore, it is in the network provider's interest to minimize the use of optical regeneration and amplification.

SUMMARY OF THE INVENTION

A method or corresponding apparatus in an example embodiment of the present invention plans network configuration in an optical network. In order to plan network configuration, the example embodiment determines candidate locations to place pre- or post-amplifiers along spans of the optical network as a function of loss in each span, expected traffic patterns, and proposed regeneration locations along paths of expected traffic. The example embodiment determines regeneration locations for placing regenerator modules based on the candidate locations and determines a plurality of costs for maintaining signal strength in a corresponding plurality of network configurations, where the network configurations include (i) a configuration including regenerators, (ii) a configuration including pre- or post-amplifiers, and (iii) a configuration including pre- and post-amplifiers in the candidate locations and including the determined regenerator modules. The example embodiment selects a configuration from among the plurality of network configurations as a function of the plurality of costs.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
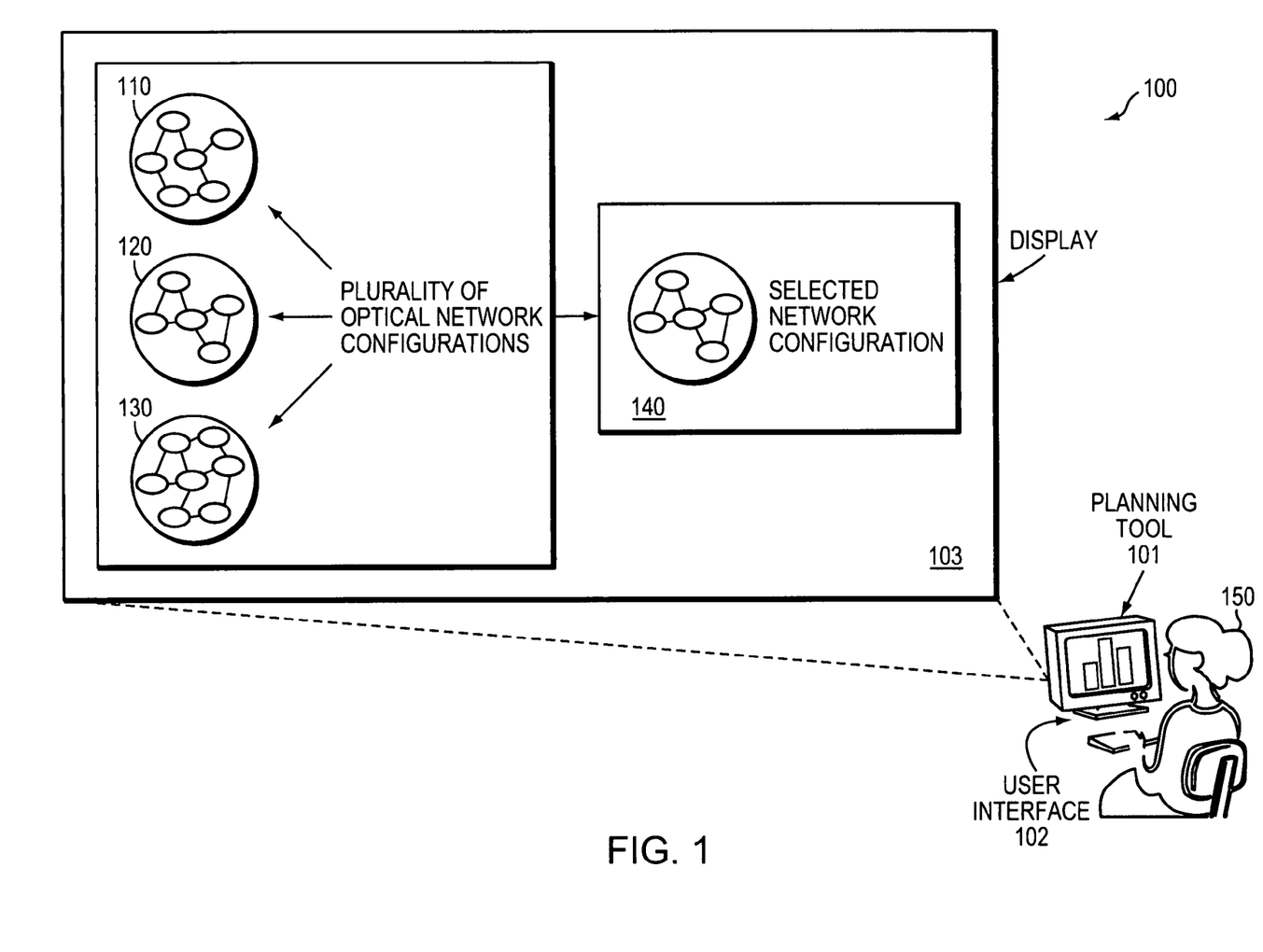
FIG. 1 is a schematic diagram that illustrates a user using an example embodiment of the present invention for planning deployment of optical network elements.

FIG. 1 is a schematic diagram that illustrates an example embodiment 100 of the present invention for a planning tool 101 used for planning network configuration in an optical network. The topology of the optical network may include a plurality of nodes, optical amplifiers, and optical regenerators. The optical network may be organized in various arrangements, such as a ring, a linear, or a mesh topology. The planning tool 101 may include a display module 103 that displays a selection of configurations to a user 150. The planning tool may also employ a user interface 102 (such as a keyboard or a mouse) for connecting the user 150 to the planning tool 101.

The planning tool 101 determines a plurality of costs for maintaining signal strength in a corresponding plurality of network configurations. The cost for maintaining signal strength in a network may be determined as a function of the cost of network elements (e.g., regenerators and amplifiers) for maintaining signal strength in the network. In this non-limiting example embodiment 100, the planning tool determines a first cost associated with a first network configuration 110, a second cost associated with a second network configuration 120, and a third cost associated with a third network configuration 130. The example embodiment selects a configuration 140 from among the first 110, the second 120, and the third 130 network configurations as a function of the costs. For example, the planning tool 101 may determine the selected network configuration 140 as the network configuration with the smallest cost.

Alternatively, the planning tool 101 may enable the user 150 to select from among the plurality of the network configurations 110, 120, 130.

In the view of the foregoing, the following description illustrates example embodiments and features that may be incorporated into a system for planning network configuration in an optical network, where the term "system" may be interpreted as a system, subsystem, device, apparatus, method, or any combination thereof.

The system may repeatedly determine a set of additional candidate locations for placing additional pre- or post-amplifiers and, for each set, determine respective regeneration locations for placing additional regenerator modules and a corresponding cumulative cost for maintaining signal strength using the additional pre- or post-amplifiers and the additional regenerator modules. The system may select a network configuration based on the plurality of costs and the cumulative cost, and may select the configuration corresponding to the smallest of the costs. The system may repeatedly determine a set of additional candidate locations for a predetermined number of iterations or a predetermined length of time and may determine a number of regeneration locations along each path in the optical network and rank the paths based on the number of regeneration locations along each path. The system may determine the candidate locations by ranking spans of each path according to the loss in each span and identify candidate locations for placing the pre- or post-amplifiers along the paths by identifying spans along the paths having the highest amount of loss. The system may determine the candidate locations given a specified number of locations to place the pre- or post-amplifiers based on a distribution of proposed regenerators of the first network configuration (or configuration including regeneration).

The system may measure the signal strength and loss in each span by measuring Optical Signal to Noise Ratio. The optical network may include ring, mesh, line, or chain network topologies, or combinations thereof. The pre- or post-amplifiers may be Raman amplifiers.

Figure 2:
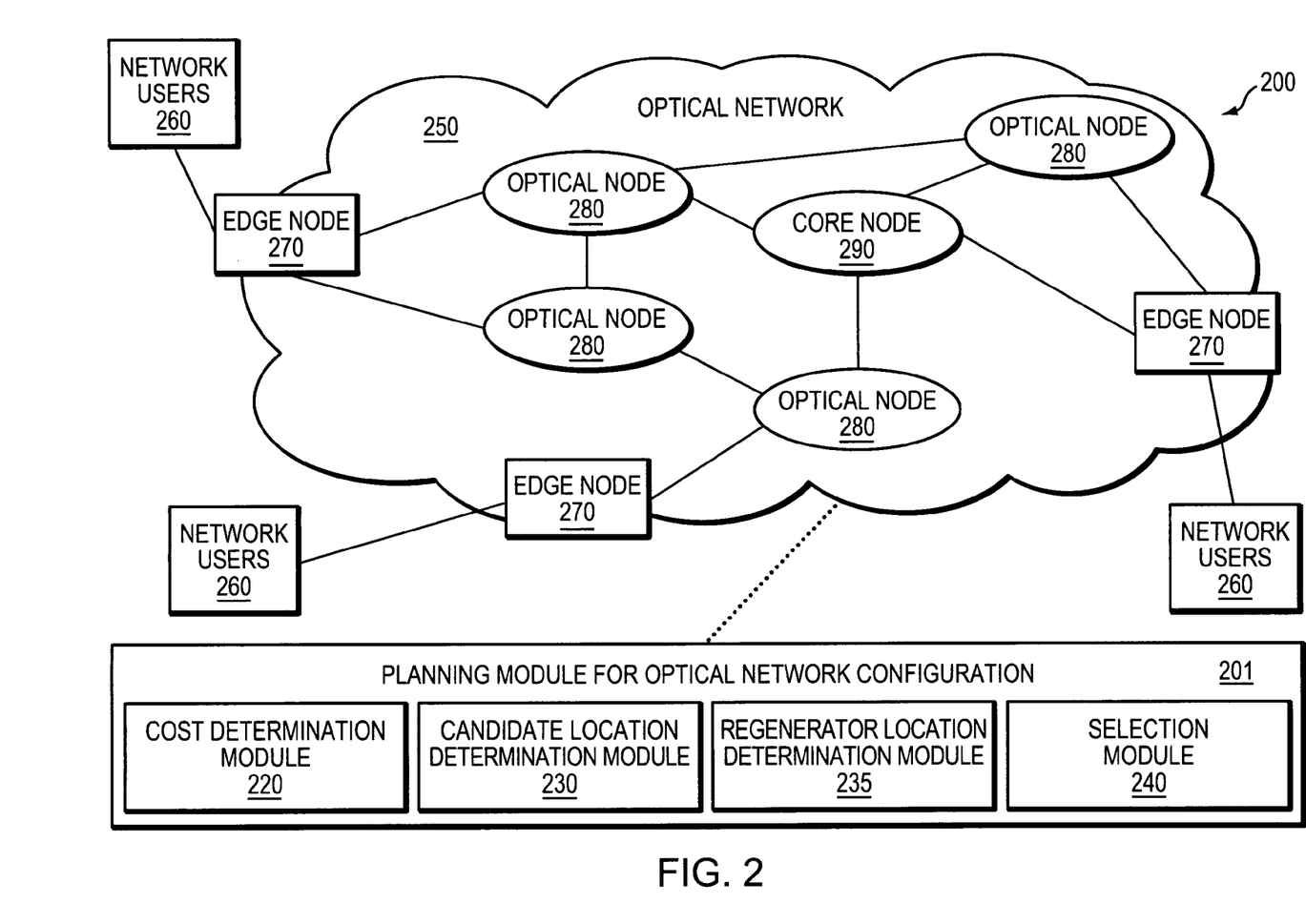
FIG. 2 is a schematic diagram that illustrates an optical network that employs a planning module for planning optical network configuration according to an example embodiment of the present invention.

FIG. 2 is a schematic diagram that illustrates an optical network 250 that employs a planning module 201 for planning optical network 250 configuration according to an example embodiment 200 of the present invention. The topology of the optical network 250 may include one or more core nodes 290 connected to a plurality of optical nodes 280. The optical network 250 topology may also include edge nodes 270 connected directly or indirectly (i.e., via optical nodes) to the core node 290. Network users 260 connect to the optical network 250 via the edge nodes 270.

The planning module 201 includes a cost determination module 220, a candidate location determination module 230, a regenerator location determination module 235, and a selection module 240. The cost determination module 220 determines a plurality of costs for maintaining signal strength in corresponding plurality of network configurations. For example, the cost determination module 220 may obtain a first cost for maintaining signal strength in an optical network configuration that only employs regenerators. Similarly, the cost determination module 220 may determine a second cost for maintaining signal strength in a network that only employs pre-amplifiers or post-amplifiers, such as Raman amplifiers.

The candidate location determination module 230 considers factors such as loss in each span, expected traffic patterns, and proposed regeneration locations along paths of expected traffic to determine candidate locations for placing pre-amplifiers or post-amplifiers along spans of the optical network 250. Using the candidate locations, a regenerator location determination module 235 may determine ideal locations for placing regenerator modules.

The cost determination module 220 may determine a third cost for maintaining signal strength corresponding to a third network configuration that employs pre- and post-amplifiers in the candidate locations and that employs regenerator modules in the determined regenerator locations.

The selection module 240 selects between the determined costs (i.e., the first, second, and third costs in this example embodiment 200) as a function of the costs. The selection module 240 may alternatively enable a user (not shown) to select from among the configurations. In one non-limiting example embodiment, the selection module 240 may select from among the costs by selecting the configuration corresponding to the smallest cost for maintaining signal strength in the optical network 200.

Figure 3:
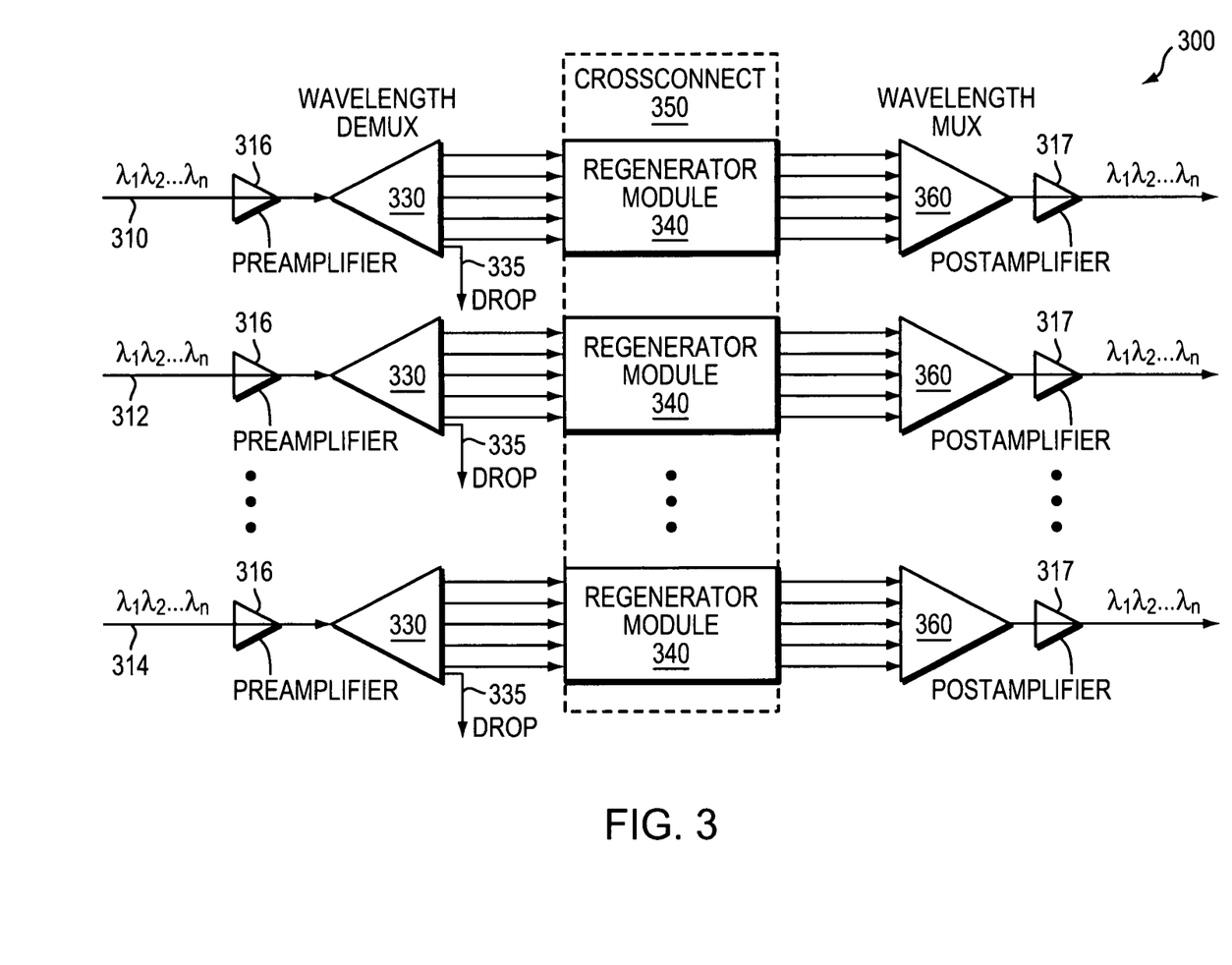
FIG. 3 is an illustration of an optical network that employs pre- or post-amplifiers and/or regenerator modules according to an example embodiment of the present invention.

FIG. 3 is an illustration of an optical network that employs pre- or post-amplifiers and/or regenerator modules according to an example embodiment 300 of the present invention (also as described in U.S. patent application Ser. No. 12/228,762, the teachings of which are incorporated by reference in their entirety). The diagram 300 shown in FIG. 3 represents an office (or network node) according to an example embodiment 300 of the present invention. In this non-limiting example, three incoming optical fibers 310, 312, 314 are shown, each carrying data on n wavelengths. The optical signal may be first amplified using an amplifier 316 (e.g., a pre-amplifier, Raman amplifier), and subsequently demultiplexed 330. The demultiplexer 330 takes as input an optical fiber 310, 312, 314 with data carried on multiple wavelengths, and separates each wavelength, implying that there are a total of n output signals from the demultiplexer 330. A demultiplexed 330 signal may either be dropped 335 or regenerated using a regenerator module 340. It should be understood that regenerating an optical signal and measuring Optical Signal to Noise Ratio are done on a wavelength-by-wavelength basis, not a combination of wavelengths. Also, it should be understood that the regenerating need not occur on every wavelength between the de-multiplexers 330 and multiplexers 350.

A signal being dropped 335 corresponds to data arriving at its destination, without the need for relaying the signal to another office within the network. When a signal needs to be regenerated, it is fed into a regeneration module 330. The example embodiment 300 depicts a 3R regeneration module, which conducts regeneration, retiming, and reshaping. This is the most conservative approach to optical regeneration, because it involves detecting the bit clock in the signal and reclocking, thereby reinstating the optical signal to its original form. Alternative techniques for regeneration that are less demanding eliminate retiming, or simply retransmit the signal without reshaping. These techniques generate less reliable signals than those created using 3R regeneration.

The example embodiment 300 outlines the regeneration modules 340 as a single crossconnect 350. This is because the regeneration modules 340 can also serve as a switch, whereby incoming signals are regenerated and their order is re-arranged. As an example, the topmost demultiplexed optical signal can be regenerated and switched through the crossconnect 350 to emerge on any of the output lines. Note that no two optical signals can be switched onto the same output line.

Finally, once the optical signals pass through the crossconnect 350, they are multiplexed 360 onto their respective optical fibers (exactly opposite the demultiplexing procedure 330), amplified using amplifiers 360 (e.g., post amplifiers, Raman amplifiers), and transmitted along the fiber on to the next office. It should be understood that the example network may include only pre-amplifiers, post-amplifiers, regenerators, or any combination thereof.

Figure 4:
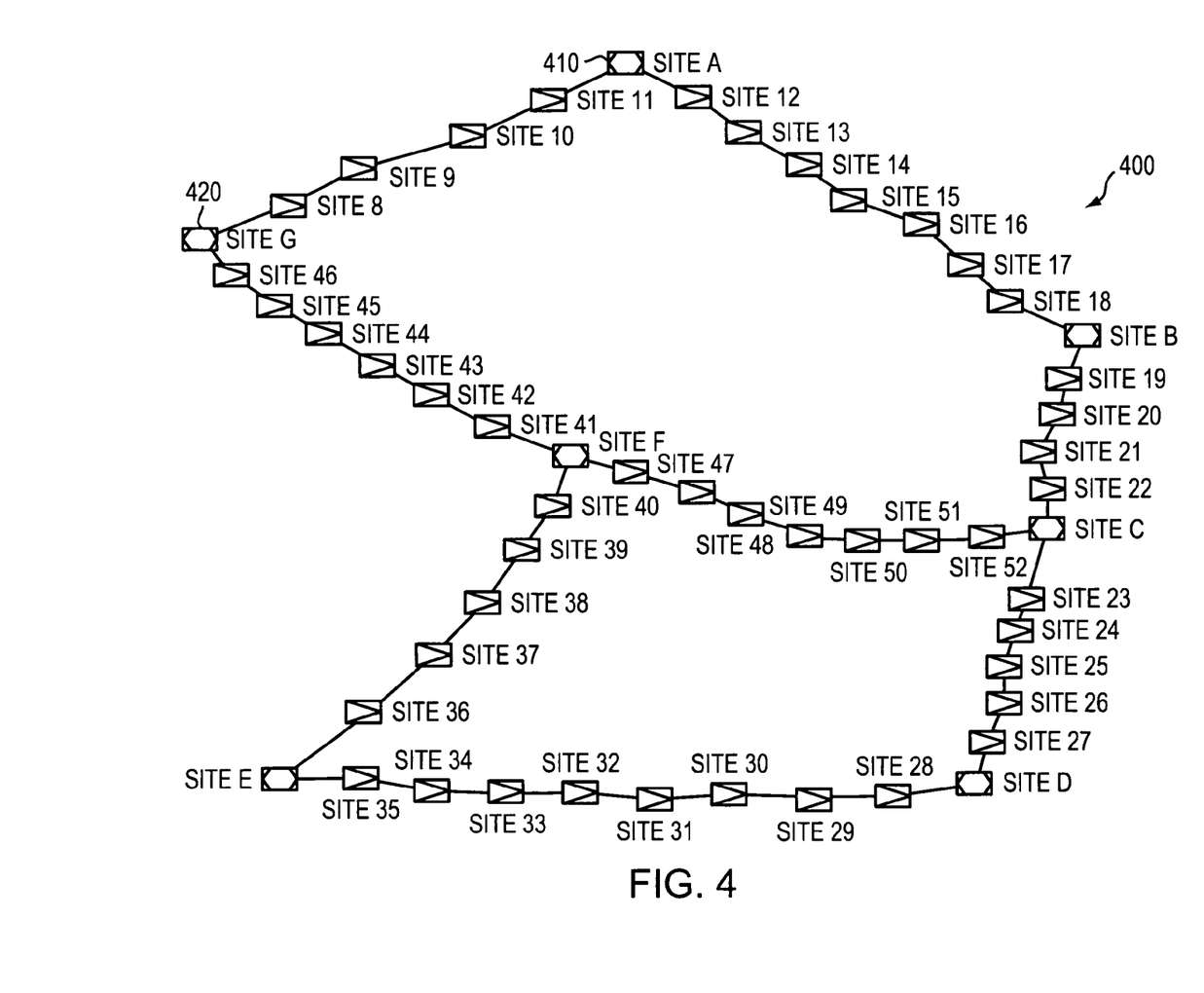
FIG. 4 is an illustration of an example optical network.

FIG. 4 is an illustration of an example optical network 400. The optical network 400 may be a metro optical network or a long haul/regional optical network. In a typical metro optical network (MON), the distance between a source optical node (such as site A 410) and a destination node (such as site G 420) is less than 500 kilometers. In contrast, in a long haul/regional optical network, the traffic distance often exceeds 1000 kilometers and may even reach 1500 kilometers or more.

In any Dense Wavelength Division Multiplexing (DWDM) network design, as the distance, or optical reach, between transponders increases, there is a higher chance that the signal being transmitted in the network would require regeneration or amplification. However, since regeneration and amplification elements are known to be very costly network components, it is desirable to keep their usage down to a minimum.

Figure 5A:
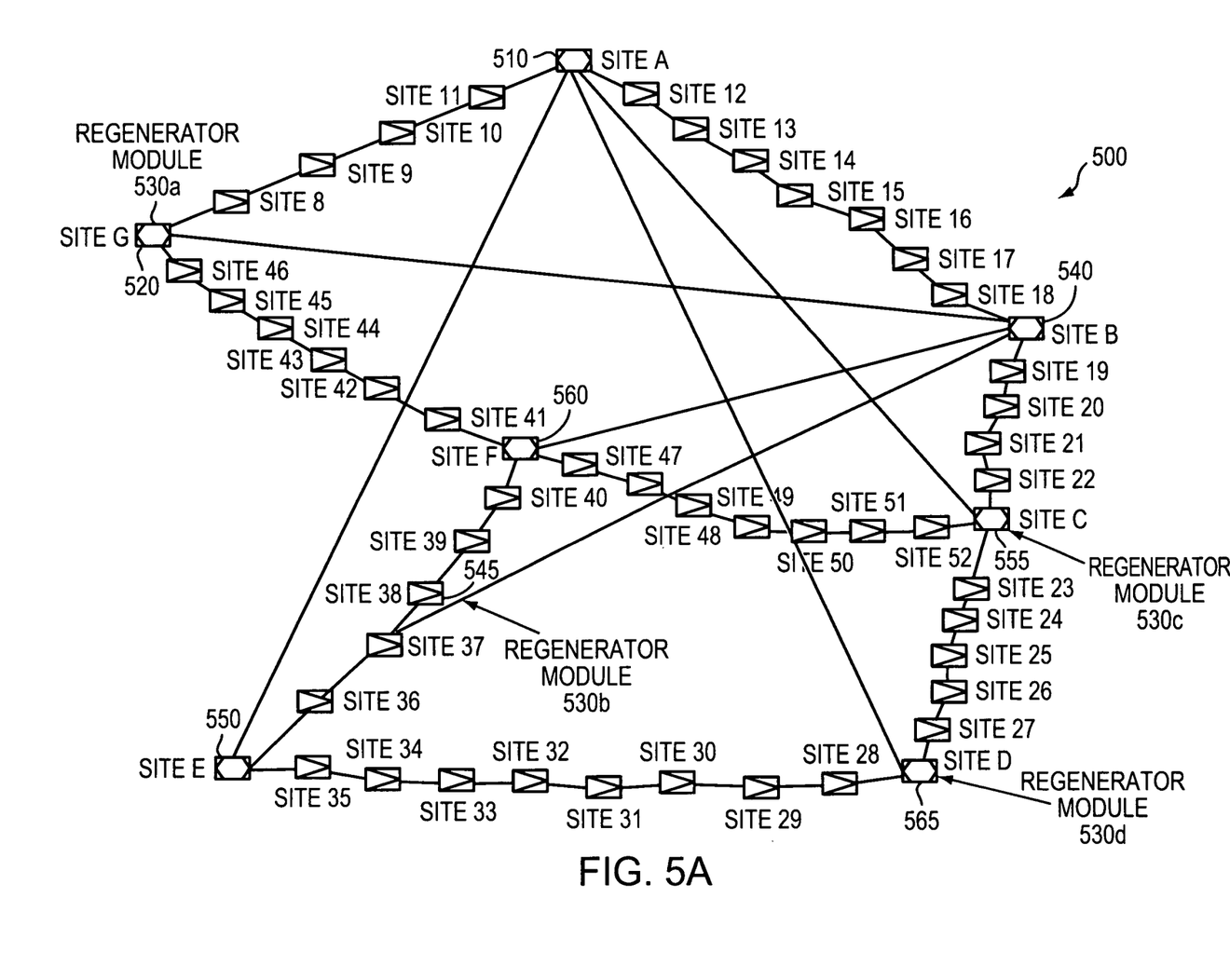
FIG. 5A is an illustration of an optical network that employs regenerator modules for regenerating signals.

FIG. 5A is an illustration of an optical network 500 that employs regenerator modules for regenerating signals, where the straight lines between nodes indicate traffic demands. In this network 500, the signal transmitted from site-A 510 to site-E 550 is regenerated using a regenerator module 530a at site-G 520 and another regenerator module 530b at site-38 545, along a route from site-A to site-E and passing through site-G, site-F, and site-38. Similarly, the signal traveling from site-B 540 to site-E 550 is regenerated along the way at site-C 555 and site-D 565 using regenerator modules 530c and 530d, respectively.

Figure 5B:
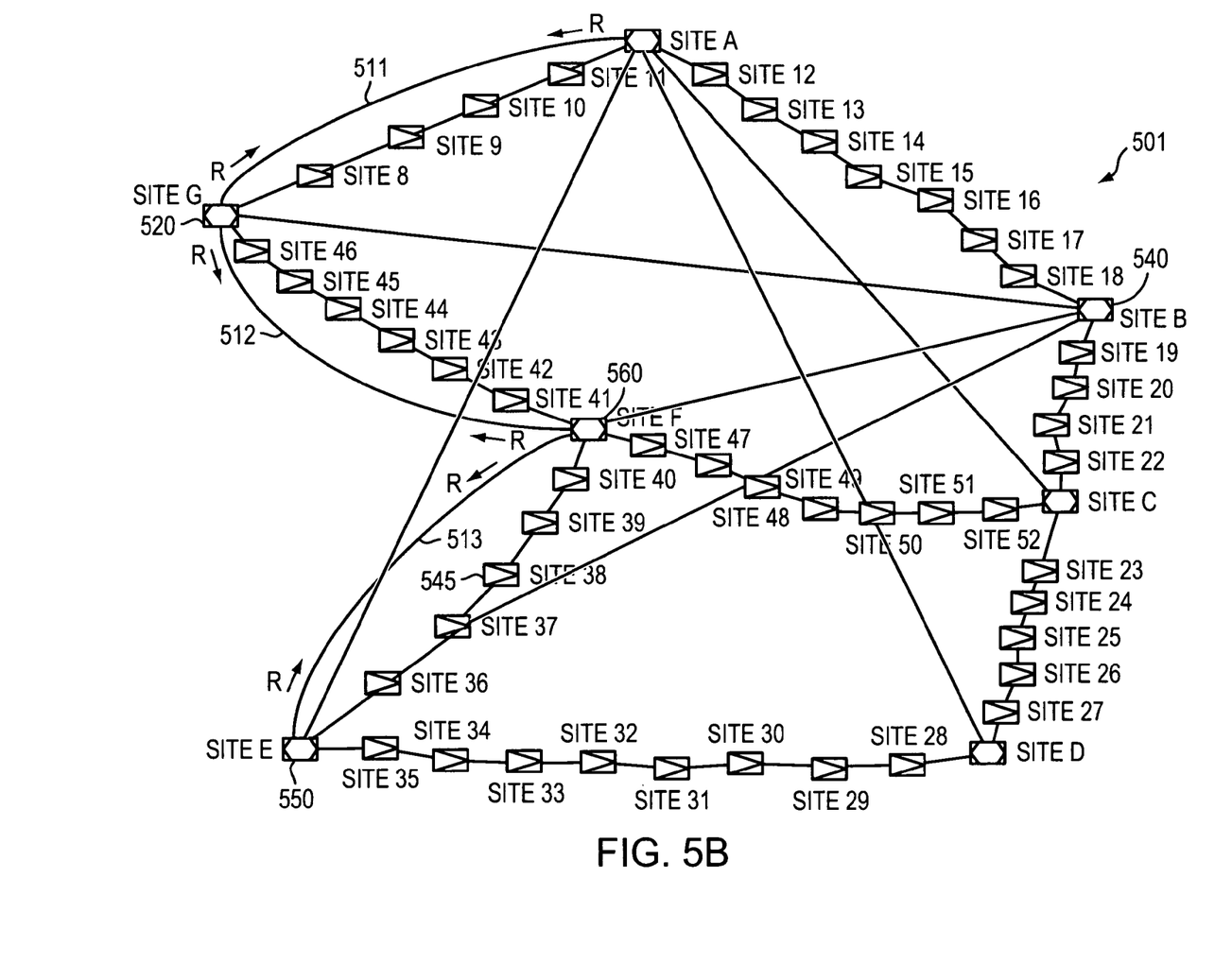
FIG. 5B is an illustration of an optical network according to an example embodiment of the present invention.

FIG. 5B is an illustration of an optical network that employs regenerator modules and pre- or post-amplifiers according to a non-limiting example embodiment 501 of the present invention. In this example embodiment, in order to help extend the reach of the optical signals, pre- or post-amplifiers (such as Raman amplifiers) are placed in the network. Pre- or post-amplifiers help compensate for the loss in spans of the optical network and, as such, improve the end-to-end signal strength and optical signal-to-noise ratio (OSNR) of the signals.

Some example embodiments may only employ pre-amplifiers, while other embodiments may only employ post-amplifiers. In other possible embodiments, a combination of pre- and post-amplifiers may be employed.

Given that optical pre- and post amplifiers are costly network components, it would be very expensive to maintain such amplifiers in every span of an optical network. Thus, an example embodiment 501 of the present invention determines the ideal locations for placing pre- and post amplifiers such that the combined cost of regeneration and amplification is minimized.

In order to determine the optimal locations for placing the pre- and post amplifiers and regeneration modules, the example embodiment 501 makes its determination based on the following factors:

N: set of sites with index n,m.
S: set of spans with index s.
D[n, m]: set of wavelength demands where n, m are source and destination nodes and n≠m.
R[r]: set of pre-determined route(s), with index r, in the network topology used between nodes n and m (typically shortest distance/OSNR path between two sites for unprotected demand or a pair of shortest diverse/disjoint paths for protected demand).

The example embodiment 501 also considers the following decision variables:

$Q_{Amplifier}[n]$: Number of pre- or post-amplifiers placed on site n.
$Q_{regen}[n, r]$: Number of regeneration modules used along route r.

The objective of the example embodiment 501 is to minimize the total cost of pre- and post amplifiers and regenerator modules:

$$\min\{cost_{amplifier} \times Q_{amplifier}[n] + cost_{regen} \times Q_{regen}[n, r]\},$$
$$n \in \forall N \text{ and } r \in \forall R$$

The example embodiment 501 may also consider additional constraints such as ensuring that all demands (protected and/or unprotected demands) are fully routed. The term "protected demand" refers to network paths with more than one path between source and destination, while an "unprotected demand" refers to a network path with a single path between the source and destination. Other constraints may impose an upper or lower threshold on the total number of channels per spans of the optical network. For example, one constraint may be that the total number of wavelength channels per span is less than or equal to 44 or 88. Another possible constraint may require that the end-to-end OSNR margin for each 10/40/100 gigabit wavelength path be greater or equal to 11 dB plus end of the line (EOL) system margin (typically 3 dB). Another possible constraint may require that the total gain be greater than or equal to the total span loss per each span or succession of spans. Another possible constraint may require an end-to-end wavelength continuity such that wavelength translation is prohibited.

In order to determine the optimal network configuration, the example embodiment 501 determines a first cost for maintaining signal strength in the optical network using regenerators (as shown in FIG. 5A) with minimal or no use of pre- or post-amplifiers. This first cost serves as an upper bound on the total number of regeneration modules for the entire network (i.e., sum of $Q_{regen}[n, r]$). The example embodiment 501, also determines a second cost for maintaining signal strength in the optical network where pre- or post-amplifiers are placed on every node of the network. This second cost serves as an upper bound on the total number of pre- or post-amplifiers that can be used (i.e., $Q_{Amplifier}[n]$) and is also an indication of a lower bound of the total number of regenerators placed on the network. The example embodiment 501 ranks and identifies span losses in a descending order. The highest identified span losses are labeled as candidate locations for placing pre- or post-amplifiers (i.e., Amplifier_Span_Candidate). The example embodiment 501 also ranks and identifies sites requiring the most amount of regeneration in a descending order (i.e., Regen_Site_Candidate). These sites are labeled as sites ideal for placing regenerator modules. Pre- and post amplifiers are then placed to compensate the top n spans in the candidate locations along the routes 511, 512, 513 that require the most number of regenerator modules (i.e., Regen_Site_Candidate, where n denotes a user-defined parameter). Using the determined number of pre- or post-amplifiers and regenerator modules, the example embodiment 501 determines $Q_{regen}[n, r]$ and $Q_{Amplifier}[n]$ and the objective function:

$$\min\{cost_{amplifier} \times Q_{amplifier}[n] + cost_{regen} \times Q_{regen}[n, r]\},$$
$$n \in \forall N \text{ and } r \in \forall R$$

If necessary, the example embodiment may repeatedly determining a set of additional candidate locations for placing additional pre- or post-amplifiers and, for each set, determine respective regeneration locations for placing additional regenerator modules and a corresponding cumulative cost for maintaining signal strength using the additional pre- or post-amplifiers and the additional regenerator modules.

Amplifiers and regenerators are both costly network elements. In fact, amplifiers may be more costly than regenerators to setup and maintain. However, often a smaller number of amplifiers is required in place of a larger number regenerators. Thus, in order to determine the most cost effective network configuration, the example embodiment considers the cost of all network elements deployed. For example, using the objective function described above, for signals traveling between site-A 510 to site-E 550, if the total number of wavelengths on this route is only 2, it is more cost effective to employ 6 regenerator modules (2 regenerators at three locations) than to place pre- or post-amplifiers on 5 spans (total of 10 amplifiers) if it is assumed that the configuration cost for an amplifier is the same as a configuration cost for a regenerator. However, as the total number of wavelengths increases (for example, when having a signal with 30 wavelengths or more), using pre- or post-amplifiers offers a more cost effective option.

Figure 6:
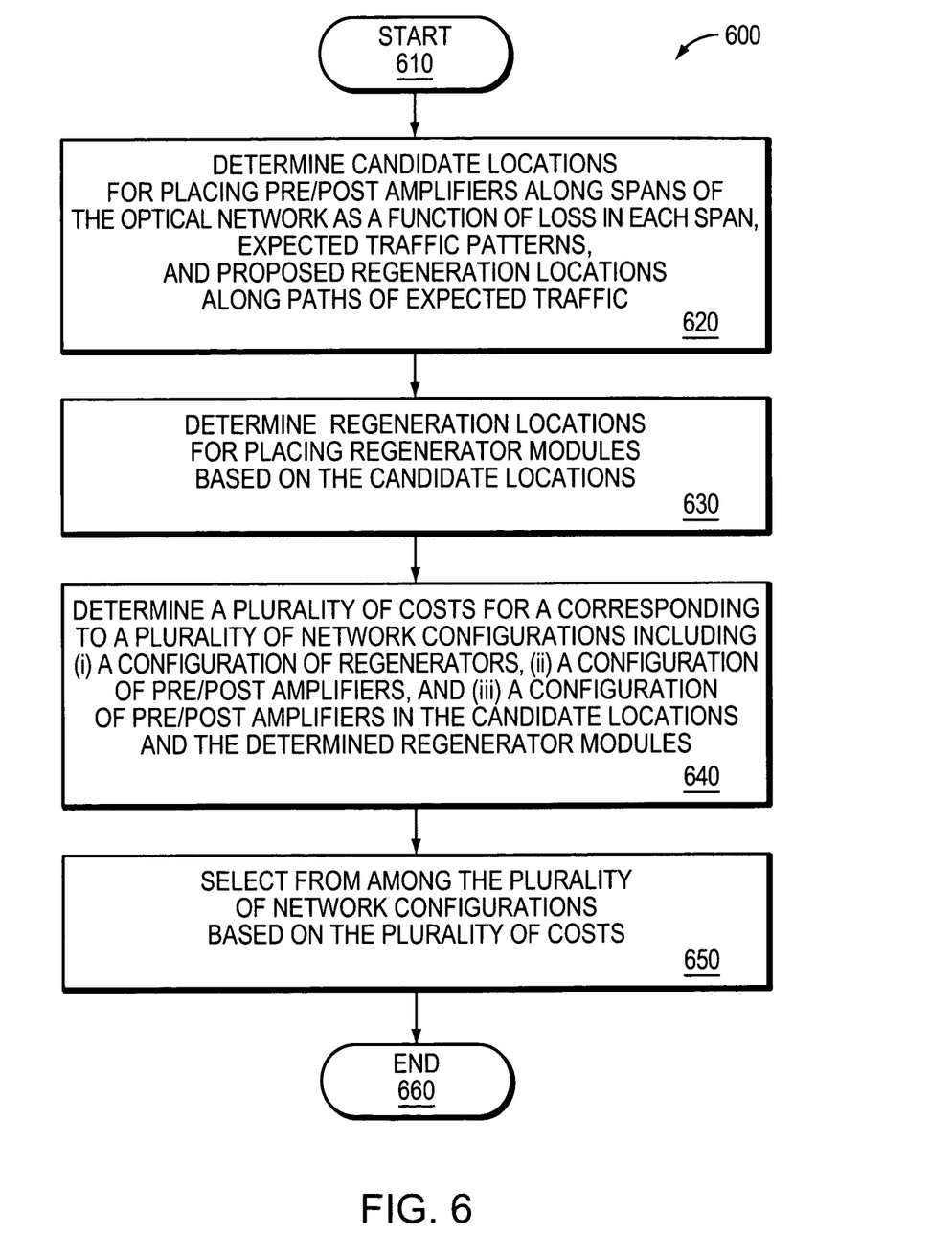
FIG. 6 is a high level flow diagram of an example embodiment of the present invention.

FIG. 6 is a high level flow diagram 600 of an example embodiment of the present invention. The example embodiment 600 may determine candidate locations for placing pre- or post-amplifiers along spans of the optical network as a function of loss in each span, expected traffic patterns, and proposed regeneration locations along paths of expected traffic 620. Based on the candidate locations, the example embodiment 600 may determine regeneration locations for placing regenerator modules 630. The example embodiment 600 determines a plurality of costs for maintaining signal strength in a corresponding plurality of network configurations 640. The network configurations include (i) a configuration of regenerators, (ii) a configuration of pre- or post-amplifiers, and (iii) a configuration of pre- and post-amplifiers in the candidate locations and the determined regenerator modules. The example embodiment 600 selects a configuration from among the plurality of network configurations as a function of the plurality of costs 650.

Figure 7:
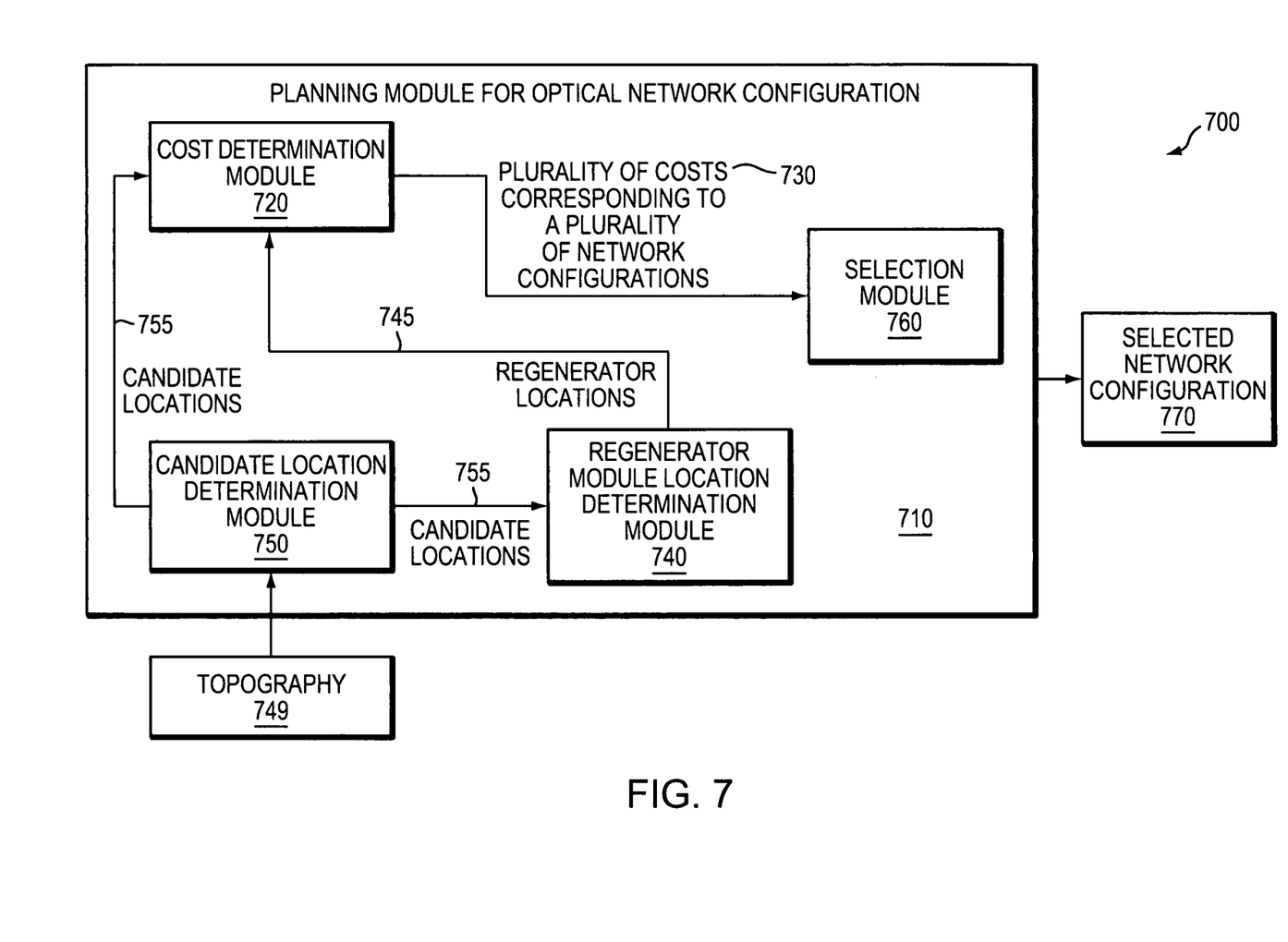
FIG. 7 is a high level block diagram of an example embodiment of the present invention.

FIG. 7 is a high level block diagram of an example embodiment 700 of the present invention for planning network configuration in an optical network. The planning module 710 includes a candidate location determination module 750 that determines candidate locations 755 for placing pre- or post-amplifiers along spans of the optical network. The candidate location determination module 750 determines the candidate locations 755 as a function of network topography 749 that includes functions such as loss in each span, expected traffic patterns, and proposed regenerator module locations along paths of expected traffic. The planning module 710 also includes a regeneration location determination module 740 that determines regeneration locations 745 for placing regenerator modules based on the candidate locations 755. A cost determination module 720 determines a plurality of costs 730 for maintaining signal strength in a corresponding plurality of network configurations, the network configurations including (i) a configuration of regenerators, (ii) a configuration of pre- or post-amplifiers, and (iii) a configuration of pre- and post-amplifiers in the candidate locations 755 and the determined regenerator modules in the regeneration locations 745. A selection module 760 selects a configuration 770 from among the plurality of network configurations as a function of the plurality of costs 730.

It should be understood that procedures, such as those illustrated by flow diagrams or block diagrams herein or otherwise described herein, may be implemented in the form of hardware, firmware, or software. If implemented in software, the software may be implemented in any software language consistent with the teachings herein and may be stored on any computer readable medium known or later developed in the art. The software, typically, in the form of instructions, can be loaded and executed by a processor in a manner understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A method for planning a network configuration in an optical network using an electronic processing device, the method comprising:

in the electronic processing device, determining candidate locations for placing pre- or post-amplifiers along spans of the optical network as a function of loss in each span, expected traffic patterns, and proposed regeneration locations along paths of expected traffic;

in the electronic processing device, determining regeneration locations for placing regenerator modules based on the candidate locations;

in the electronic processing device, determining a plurality of costs for maintaining signal strength in a corresponding plurality of network configurations stored by the electronic processing device, the network configurations including (i) a configuration of regenerators, (ii) a configuration of pre- or post-amplifiers and no regenerators, and (iii) a configuration of pre- and post-amplifiers in the candidate locations and regenerator modules in the regeneration locations determined; and in the electronic processing device, selecting a configuration from among the plurality of network configurations stored as a function of the plurality of costs determined.

2. The method of claim 1 further including repeatedly determining a set of additional candidate locations for placing additional pre- or post-amplifiers and, for each set, determining respective regeneration locations for placing additional regenerator modules and a corresponding cumulative cost for maintaining signal strength using the additional pre- or post-amplifiers and the additional regenerator modules.

3. The method of claim 2 wherein selecting a configuration includes selecting a configuration as a function of the plurality of costs and the cumulative cost.

4. The method of claim 2 wherein repeatedly determining a set of additional candidate locations includes repeatedly determining a set of additional candidate locations for a predetermined number of iterations or a predetermined length of time.

5. The method of claim 1 wherein determining the candidate locations includes determining a number of regeneration locations along each path in the optical network and ranking the paths based on the number of regeneration locations along each path.

6. The method of claim 5 wherein determining the candidate locations includes ranking spans of each path according to the loss in each span.

7. The method of claim 6 wherein determining the candidate locations includes identifying candidate locations for placing the pre- or post-amplifiers along the paths as being spans along the paths having highest amount of loss.

8. The method of claim 1 further including measuring the loss in each span by measuring Optical Signal to Noise Ratio.

9. The method of claim 1 wherein determining the candidate locations includes specifying a given number of locations to place the pre- or post-amplifiers based on a distribution of proposed regenerators of the configuration of regenerators.

10. The method of claim 1 wherein the optical network includes ring, mesh, line, or chain network topologies, or combinations thereof.

11. The method of claim 1 wherein selecting from among the plurality of network configurations includes selecting a smallest of the plurality of costs.

12. The method of claim 1 wherein the pre- or post-amplifiers are Raman amplifiers.

13. An apparatus for planning network configuration in an optical network, the apparatus comprising:
a processor;
a non-transitory computer-readable medium having encoded thereon a sequence of instructions which, when loaded and executed by the processor, causes the processor to implement:
a candidate determination module to determine candidate locations for placing pre- or post-amplifiers along spans of the optical network as a function of loss in each span, expected traffic patterns, and proposed regeneration locations along paths of expected traffic;
a regeneration location determination module to determine regeneration locations for placing regenerator modules based on the candidate locations;
a cost determination module to determine a plurality of costs for maintaining signal strength in a corresponding plurality of network configurations stored by the processor, the network configurations including (i) configuration of regenerators, (ii) a configuration of pre- or post-amplifiers and no regenerators, and (iii) a configuration of pre- and post-amplifiers in the candidate locations and regenerator modules in the regeneration locations determined; and
a selection module to select a configuration from among the plurality of network configurations stored as a function of the plurality of costs.

14. The apparatus of claim 13 wherein the candidate location determination module is configured to repeatedly determine a set of additional candidate locations for placing additional pre- or post-amplifiers and, for each set, determine respective regeneration locations for placing additional regenerator modules and a corresponding cumulative cost for maintaining signal strength using the additional pre- or post-amplifiers and the additional regenerator modules.

15. The apparatus of claim 14 wherein the selection module selects a network configuration as a function of the plurality of costs and the cumulative cost.

16. The apparatus of claim 14 wherein the candidate location determination module is configured to repeatedly determine a set of additional candidate locations for a predetermined number of iterations or a predetermined length of time.

17. The apparatus of claim 13 wherein the candidate determination module is arranged to determine a number of regeneration locations along each path in the optical network and rank the paths based on a total number of regeneration locations along each path.

18. The apparatus of claim 17 wherein the candidate determination module is arranged to determine the candidate locations as a function of ranking spans along the paths according to the loss in each span of.

19. The apparatus of claim 18 wherein candidate determination module is arranged to identify candidate locations for placing the pre- or post-amplifiers along the paths as being spans along the paths having highest amount of loss.

20. The apparatus of claim 13 further including a measurement module to measure the loss in each span by measuring Optical Signal to Noise Ratio.

21. The apparatus of claim 13 wherein the candidate determination module is arranged to determine the candidate locations as a function of a specified number of locations for placing the pre- or post-amplifiers based on a distribution of proposed regenerators of the configuration of regenerators.

22. The apparatus of claim 13 wherein the optical network includes ring, mesh, line, or chain network topologies, or combinations thereof.

23. The apparatus of claim 13 wherein the selection module is arranged to select the configuration having the smallest of the plurality of costs.

24. The apparatus of claim 13 wherein the pre- or post-amplifiers are Raman amplifiers.

25. A non-transitory computer readable medium having computer readable program codes embodied therein for planning network configuration in an optical network topology, the computer readable medium program codes including instructions that, when executed by a processor, cause the processor to:
determine candidate locations for placing pre- or post-amplifiers along spans of the optical network as a function of loss in each span, expected traffic patterns, and proposed regeneration locations along paths of expected traffic;
determine regeneration locations for placing regenerator modules based on the candidate locations;
determine a plurality of costs for maintaining signal strength in a corresponding plurality of network configurations, the network configurations including (i) a configuration of regenerators, (ii) a configuration of pre- or post-amplifiers and no regenerators, and (iii) a configuration of pre- and post-amplifiers in the candidate locations and regenerator modules in the regeneration locations determined; and
select a configuration from among the plurality of network configurations as a function of the plurality of costs.

26. The method of claim 1 wherein determining candidate locations includes determining that a total gain is greater than or equal to a total loss per each span or succession of spans.

27. The method of claim 8 wherein measuring the loss in each span by measuring Optical Signal to Noise Ratio is done on a wavelength-by-wavelength basis.

28. The apparatus of claim 13 further comprising a display module that displays the selected configuration to a user, wherein a user interface connects the user to the apparatus.

29. The method of claim 1 further comprising displaying the configuration selected to a user via a display device operatively coupled to the electronic device.

30. The method of claim 1 further comprising determining optimal locations for placing pre- and post-amplifiers such that a combined cost of regeneration and amplification is minimized.

* * * * *